3,036,999
REACTION PRODUCT OF A POLYISOCYANATE AND A 1,4,5,6,7,7-HEXAHALOBICYCLO-(2.2.1)-5-HEPTENE-2,3-DICARBOXYLIC ACID
Michael Worsley, Niagara Falls, and Raymond R. Hindersinn, Lewiston, N.Y., assignors to Hooker Chemical Corporation, Niagara Falls, N.Y., a corporation of New York
No Drawing. Filed June 22, 1959, Ser. No. 821,722
12 Claims. (Cl. 260—77.5)

This invention relates to novel resinous compositions and method for preparing same. More particularly, the present invention resides in polyurethane compositions useful for many appliactions, for example in the preparation of flame retardant rigid and flexible polyurethane foams, flame retardant polyurethane surface coatings, flame retardant polyurethane elastomers or synthetic rubbers, flame retardant adhesives, etc.

The methods of the prior art have attained fire-resistance in rigid foams by the use of various plasticizing substances, such as the various phosphate or phosphonate esters or chlorinated compounds. However, such plasticizing substances are additives which are not chemically combined with the polyurethane plastic and are progressively lost from the plastic by evaporation, leaching, etc. Consequently, the product does not have a permanently reduced flammability. Furthermore, the plasticizing additive affects the physical properties of the product. Alternatively, the art has incorporated chlorine containing compounds into the resultant product, for example, S.N. 623,795, "Fire Resistant Foams," filed November 23, 1956. This method, although it overcomes the disadvantages inherent in the use of plasticizing substances, suffers from the serious disadvantage that the incorporation of the chlorine containing compound into the polyester causes a rapid increase in viscosity, and solid compositions usually result at a chlorine content greater than fifteen percent.

Most flexible polyurethane foams are claimed to be fire resistant per se and therefore, very little has been done to increase the fire resistance of these materials. The claimed fire resistance, however, usually is based on the fact that such materials are self extinguishing when the foams are ignited by virtue of the fact that the burning elastomeric material melts and falls away from the article thus extinguishing the flame. The melt, however, is flammable and will burn if ignited.

It is, therefore, an object of the present invention to provide a resinous composition which is useful in the preparation of flame retardant rigid and flexible polyurethane foams, adhesives, coating compositions and elastomers, which composition is liquid at room temperature and thereby may be handled by conventional metering and pumping equipment. It is a further object of the present invention to obtain a resinous composition which is easily prepared and can be used to easily and inexpensively prepare products having excellent physical characteristics. An additional object is to prepare truly fire resistant polymers and polymeric materials which are nonflammable both in the solid and molten state. Further objects and advantages will appear hereinafter.

In accordance with the present invention, it has been found that high halogen containing, resinous polyurethane compositions which are liquid at room temperature may be prepared by adding (I) the dicarboxylic acid adduct of hexahalocyclopentadiene and maleic anhydride wherein the halogen is selected from the group consisting of chlorine, bromine, fluorine and mixtures thereof to (II) an organic polyisocyanate in the ratio of one carboxyl group to at least four isocyanate groups. When the polyisocyanate is a diisocyanate the ratio is one mole of the adduct to four moles of the diisocyanate.

The diisocyanate or polyisocyanate that may be employed is preferably liquid in order to readily react with the solid hexahalocyclopentadiene adduct. Aromatic isocyanates are preferred because they are more reactive and less toxic than the aliphatic members. Typical isocyanates include the following: 2,4-tolylene diisocyanate; 2,6-tolylene diisocyanate; hexamethylene diisocyanate; ethylene diisocyanate; trimethylene diisocyanate; tetramethylene diisocyanate; pentamethylene diisocyanate; 1,2-propylene diisocyanate; 1,2-butylene diisocyanate; 2,3-butylene diisocyanate; 1,3-butylene diisocyanate; the liquid reaction products of (1) diisocyanates and (2) polyols or polyamines, etc. In addition, mixtures of isocyanates may be employed. The preferred isocyanates are the diisocyanates, especially mixtures thereof, because they are readily available commercially.

The preferred adduct of hexahalocyclopentadiene is 1,4,5,6,7,7 - hexachlorobicyclo - (2.2.1) - 5 - heptene-2,3-dicarboxylic acid because it is readily available commercially. Others that may be employed include 1,4,5,6-tetrachloro - 7,7 - difluorobicyclo - (2.2.1) - 5 - heptene-2,3 - dicarboxylic acid, 1,4,5,6,7,7 - hexabromobicyclo-(2.2.1)-5-heptene-2,3-dicarboxylic acid, etc.

In the preparation of the reaction products of the present invention, the hexahalocyclopentadiene adduct should preferably be below ten mesh. The hexahalocyclopentadiene adduct is added to the isocyanate at a temperature preferably from about thirty to one hundred and twenty degrees centigrade. Higher or lower temperatures may be used as desired. The ratios employed of hexahalocyclopentadiene adduct to polyisocyanate are such as to provide one carboxyl group to at least four isocyanate groups. After the polyisocyanate and the hexahalocyclopentadiene adduct are mixed together, the reaction product is heated at a temperature preferably from about one hundred and ten to one hundred and thirty degrees centigrade for preferably from about thirty minutes to one hour and thirty minutes.

The resinous reaction products of the present invention may be reacted with a hydroxyl containing polyester or polyether in the presence of a foaming agent such as trichlorofluoromethane, etc., and optionally a catalyst may be employed. The catalyst employed may be any of the known conventional catalysts for isocyanate reactions, such as tertiary amines, for example, triethylamine, N-methyl morpholine, triethanolamine, etc., or antimony compounds such as disclosed and claimed in S.N. 803,820, for example, antimony caprylate, antimony naphthenate or antimonous chloride. In addition, tin compounds may be employed such as disclosed and claimed in S.N. 803,819, for example, dibutyltin dilaurate, tri-n-octyltin oxide, hexabutylditin, tributyltin phosphate or stannic chloride. Rigid or flexible polyurethane foams are thereby obtained. The rigid polyurethane foams utilize a highly branched hydroxyl rich polyester or polyether having a hydroxyl number of between two hundred and five hundred. The flexible polyurethane foams utilize a linear, relatively hydroxyl poor polyester or polyether having a hydroxyl number of between thirty and one hundred. If a polyester or polyether with a hydroxyl number of one hundred to two hundred is employed, a semirigid polyurethane foam is obtained.

The polyesters employed are known in the art and are the reaction products of a polyhydric alcohol and a polycarboxylic compound, i.e., a polycarboxylic acid, polycarboxylic acid anhydride, polycarboxylic acid halide or polycarboxylic acid ester, or mixtures thereof.

The polyethers are the reaction products known in the art and are the products of a polyhydric alcohol and a 1,2-epoxide, such as, for example, propylene oxide.

The fire-resistant surface coatings prepared from the reaction products of the present invention are prepared by reacting the reaction products of the present invention with low molecular weight polyesters or polyethers in the presence of an inert solvent. Alternatively, fire-resistant surface coatings may be obtained by reacting the reaction products of the present invention with liquid hydroxyl containing glycerides in the presence of an inert solvent. In each case, appropriate reaction catalysts may be employed if desired.

Fire-resistant elastomers or synthetic rubbers may be obtained by reacting the reaction products of the present invention with a linear polyester or polyether, preferably in the presence of a reaction catalyst. The resultant product is then milled, etc., by procedures known to the art. Optionally, fillers and modifying agents such as are known to the art are employed.

Fire-resistant adhesives may also be obtained in the conventional manner. A solvent may or may not be employed and the adhesives are preferably prepared in the presence of a reaction catalyst.

The following examples are found.

*Example 1.—Chlorine Containing Resinous Material*

Five hundred and ninety-three grams of powdered 1,4,5,6,7,7-hexachlorobicyclo-(2.2.1)-5-heptene-2,3-dicarboxylic acid was added to 1380 grams of a mixture of 80 percent 2,4-tolylene diisocyanate and 20 percent 2,6-tolylene diisocyanate at a temperature of 80 degrees centigrade. There was a brisk evolution of gas throughout the addition of the acid. After the final addition of the acid, the temperature was raised to 110 degrees centigrade for one-half an hour. The product was cooled and discharged to yield a liquid resinous product of the following characteristics:

NCO content _____ percent__ 29.7
Cl content _____ do____ 17.5
Gardner viscosity at 25° C _____ seconds__ 8.0

*Example 2.—Preparation of a Rigid Polyurethane Foam*

To 100 grams of the resinous reaction product obtained in Example 1, was added 25 grams of trichlorofluoromethane foaming agent. The two materials were mixed together at room temperature. To this solution was added 100 grams of a commercial polyester prepared from 35 parts by weight of a polyether which is the reaction product of trimethyloyl propane and propylene oxide, and 65 parts by weight of a polyester prepared from 12 moles of trimethyloy propane, 6 moles of 1,4,5,6,7,7-hexachlorobicyclo-(2.2.1)-5-heptene-2,3-carboxylic acid reacted to an acid number of less than ten. One-half gram of dibutyltin dilaurate was added as a catalyst and the mixture rapidly stirred for 15 seconds. The reaction begins immediately and yields a rigid, flame retardant foam having a density of 2.3 pounds per cubic foot.

*Example 3.—Preparation of a Flexible Polyurethane Foam*

To 71 grams of the reaction product of Example 1 was added a solution of the following ingredients: 100 grams of polypropylene glycol having a molecular weight of 2010; 3 grams of concentrated aqueous ammonium hydroxide, 28 percent solution; 0.7 gram of dimethyl silicone (Dow-Corning 200); and 0.5 gram of dibutyltin dilaurate. The mixture was stirred for 15 seconds and poured into a mold. It was cured for 15 minutes at 120 degrees centigrade after which time it was compressed and cured for 15 additional minutes at 120 degrees centigrade. The resultant flexible foam had a density of 2.6 pounds per cubic foot and was self extinguishing upon ignition and the molten material was also self extinguishing.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. The liquid resinous reaction product of (I) 1,4,5,6,7,7-hexahalobicyclo-(2.2.1)-5-heptene-2,3-dicarboxylic acid wherein the halogen is selected from the group consisting of chlorine, bromine, fluorine and mixtures thereof, and (II) an organic polyisocyanate; said reaction product containing at least some free isocyanate groups.

2. The product of claim 1 wherein compound (I) is 1,4,5,6,7,7 - hexachlorobicyclo - (2.2.1) - 5 - heptene - 2,3-dicarboxylic acid.

3. The product of claim 2 wherein said organic polyisocyanate (II) is tolylene diisocyanate.

4. The product of claim 2 wherein said organic polyisocyanate (II) is a mixture of 2,4-tolylene diisocyanate and 2,6-tolylene diisocyanate.

5. A process for preparing a liquid resinous reaction product which comprises adding (I) 1,4,5,6,7,7-hexahalobicyclo-(2.2.1)-5-heptene-2,3-dicarboxylic acid wherein the halogen is selected from the group consisting of chlorine, bromine, fluorine and mixtures thereof, to (II) an organic polyisocyanate in the ratio of one carboxyl group to at least four isocyanate groups.

6. A process according to claim 5 wherein compound (I) is 1,4,5,6,7,7-hexachlorobicyclo-(2.2.1)-5-heptene-2,3-dicarboxylic acid.

7. A process according to claim 6 wherein said organic polyisocyanate (II) is tolylene diisocyanate.

8. A process according to claim 6 wherein said organic polyisocyanate (II) is a mixture of 2,4-tolylene diisocyanate and 2,6-tolylene diisocyanate.

9. A process for preparing a liquid resinous reaction product which comprises adding (I) one mole of 1,4,5,6,7,7-hexahalobicyclo-(2.2.1)-5-heptene-2,3-dicarboxylic acid wherein the halogen is selected from the group consisting of chlorine, bromine, fluorine and mixtures thereof, to (II) at least four moles of an organic diisocyanate.

10. The process of claim 9 wherein the compound (I) is 1,4,5,6,7,7-hexachlorobicyclo-(2.2.1)-5-heptene-2,3-dicarboxylic acid.

11. The liquid resinous reaction product of (I) 1,4,5,6,7,7 - hexahalobicyclo - (2.2.1) - 5 - heptene - 2,3 -dicarboxylic acid, wherein the halogen is selected from the group consisting of chlorine, bromine, fluorine and mixtures thereof, and (II) an organic diisocyanate; said reaction product containing at least some free isocyanate groups.

12. The product of claim 11 wherein the compound (I) is 1,4,5,6,7,7 - hexachlorobicyclo - (2.2.1) - 5 - heptene-2,3-dicarboxylic acid.

References Cited in the file of this patent

UNITED STATES PATENTS

| | | |
|---|---|---|
| 2,268,586 | Gilman | Jan. 6, 1942 |
| 2,284,896 | Hanford et al. | June 2, 1942 |
| 2,841,485 | Johnson | July 1, 1958 |
| 2,898,256 | Robitschek et al. | Aug. 4, 1959 |

FOREIGN PATENTS

| | | |
|---|---|---|
| 567,045 | Canada | Dec. 2, 1958 |